Figure 1:
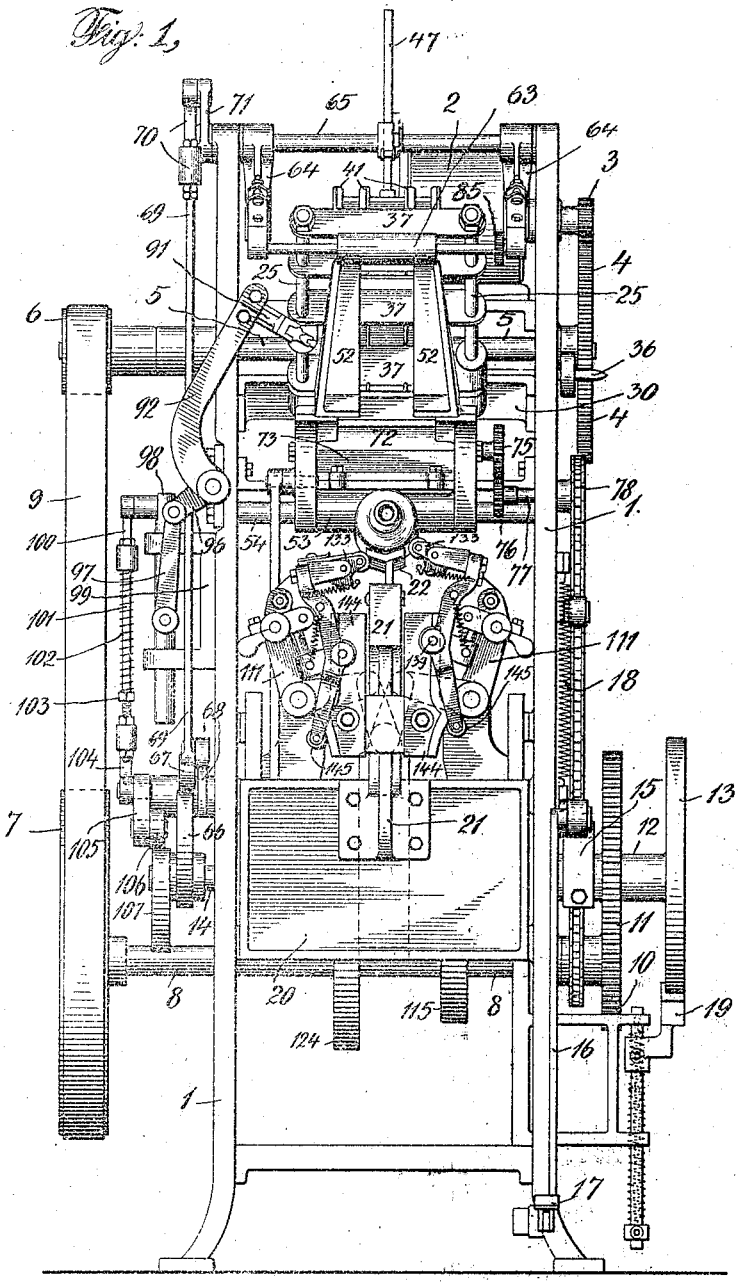

E. ERMOLD.
BOTTLE LABELING MACHINE.
APPLICATION FILED SEPT. 21, 1910.

1,023,143.

Patented Apr. 16, 1912.
13 SHEETS—SHEET 7.

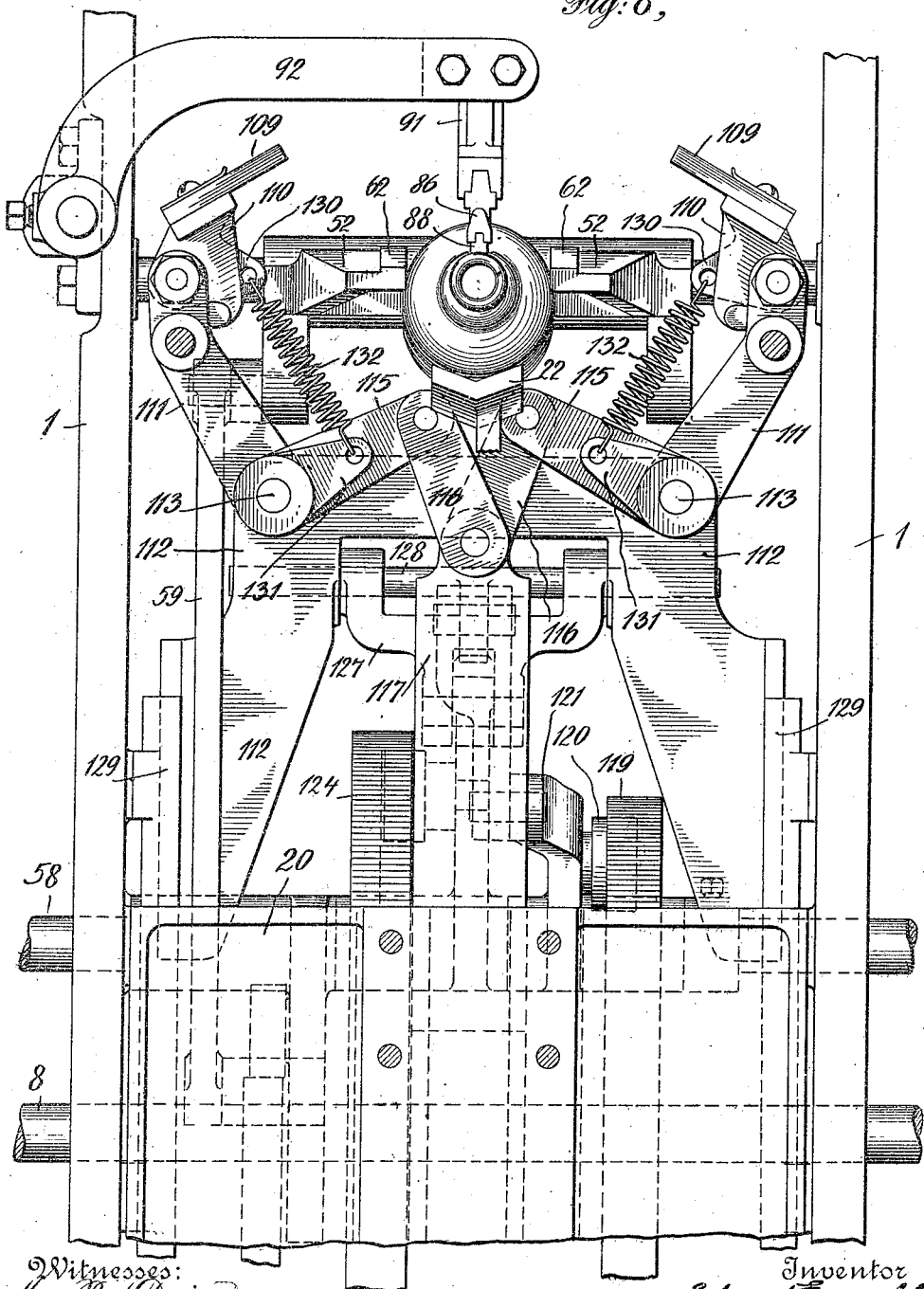

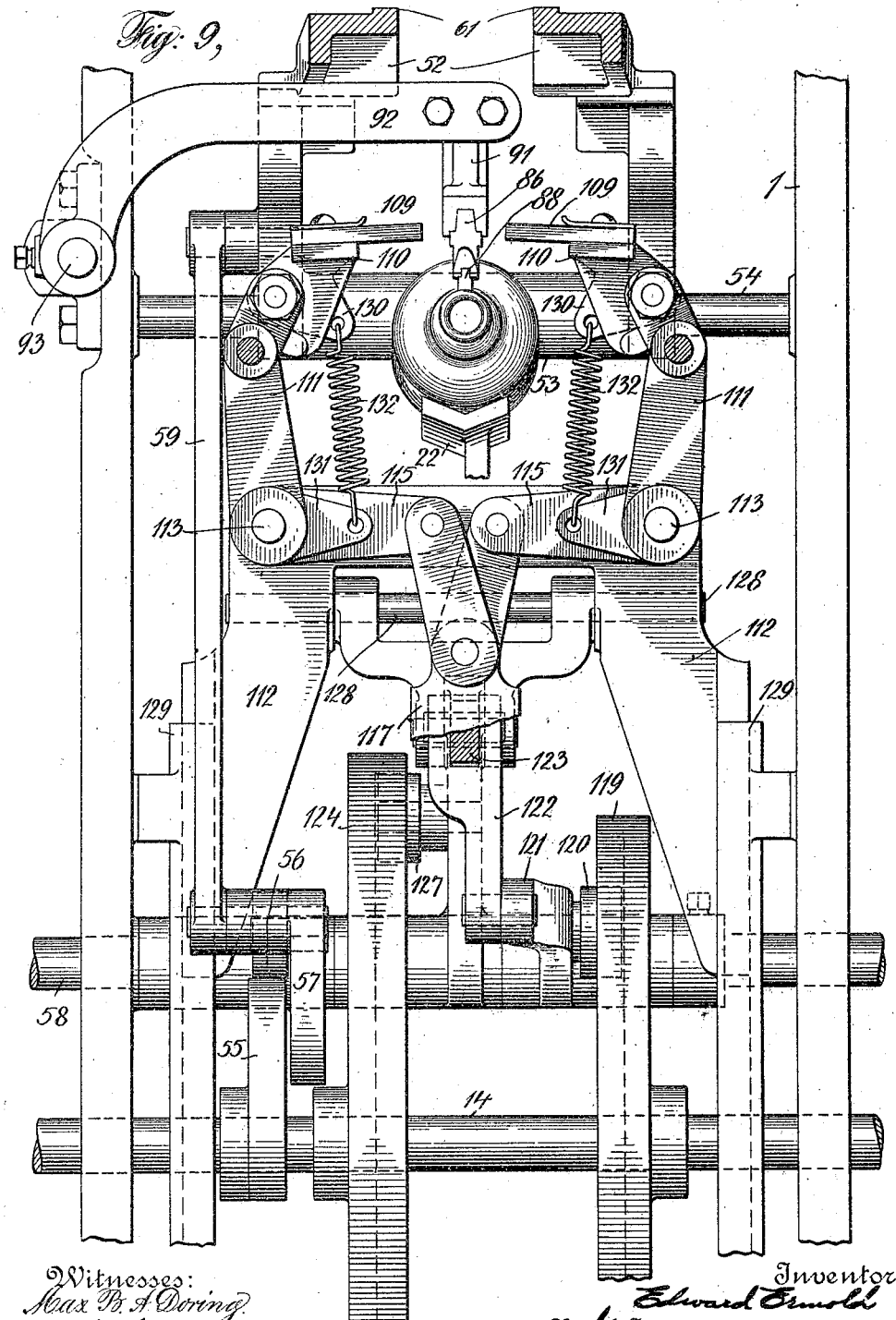

E. ERMOLD.
BOTTLE LABELING MACHINE.
APPLICATION FILED SEPT. 21, 1910.
1,023,143.
Patented Apr. 16, 1912.
13 SHEETS—SHEET 10.
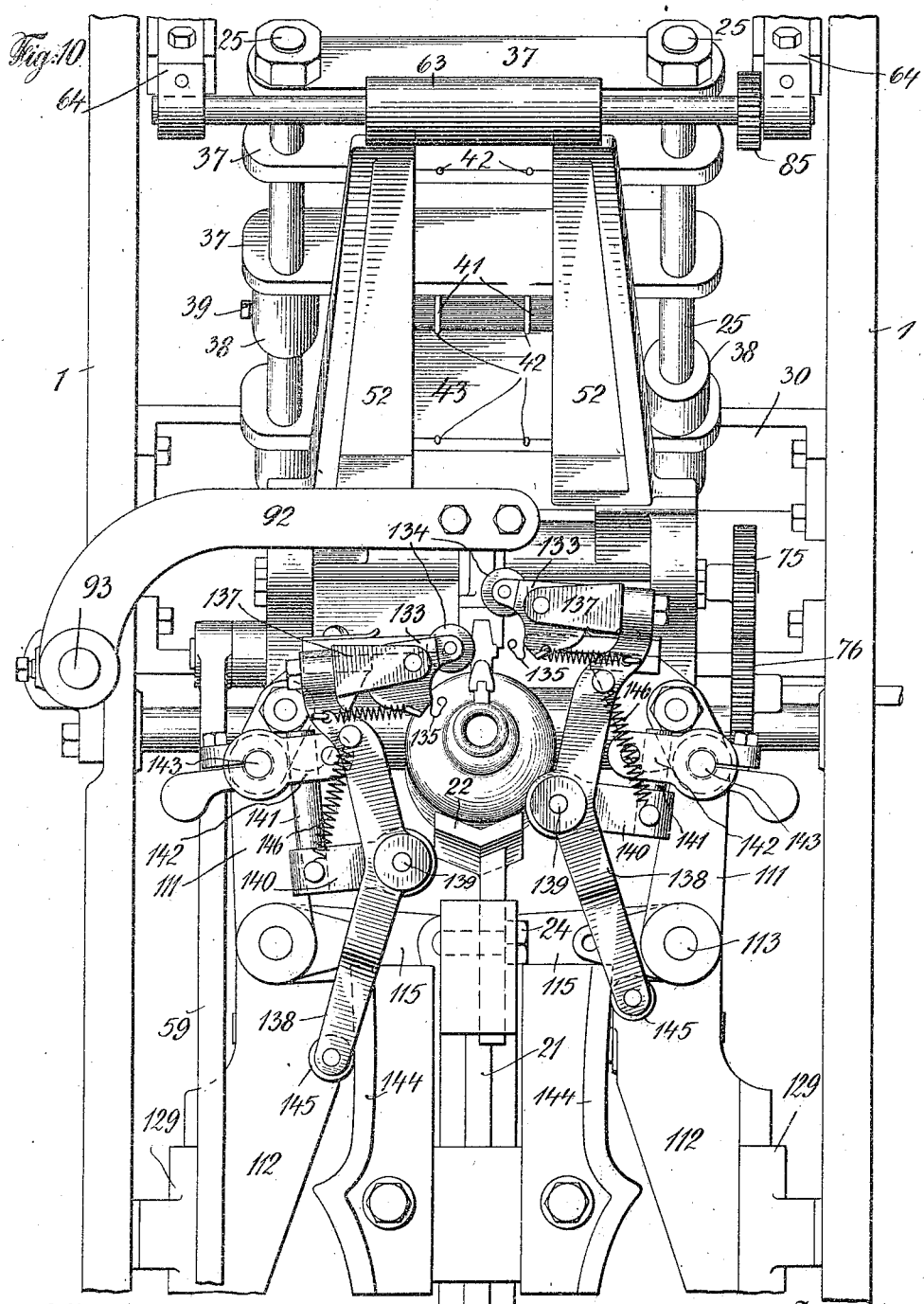

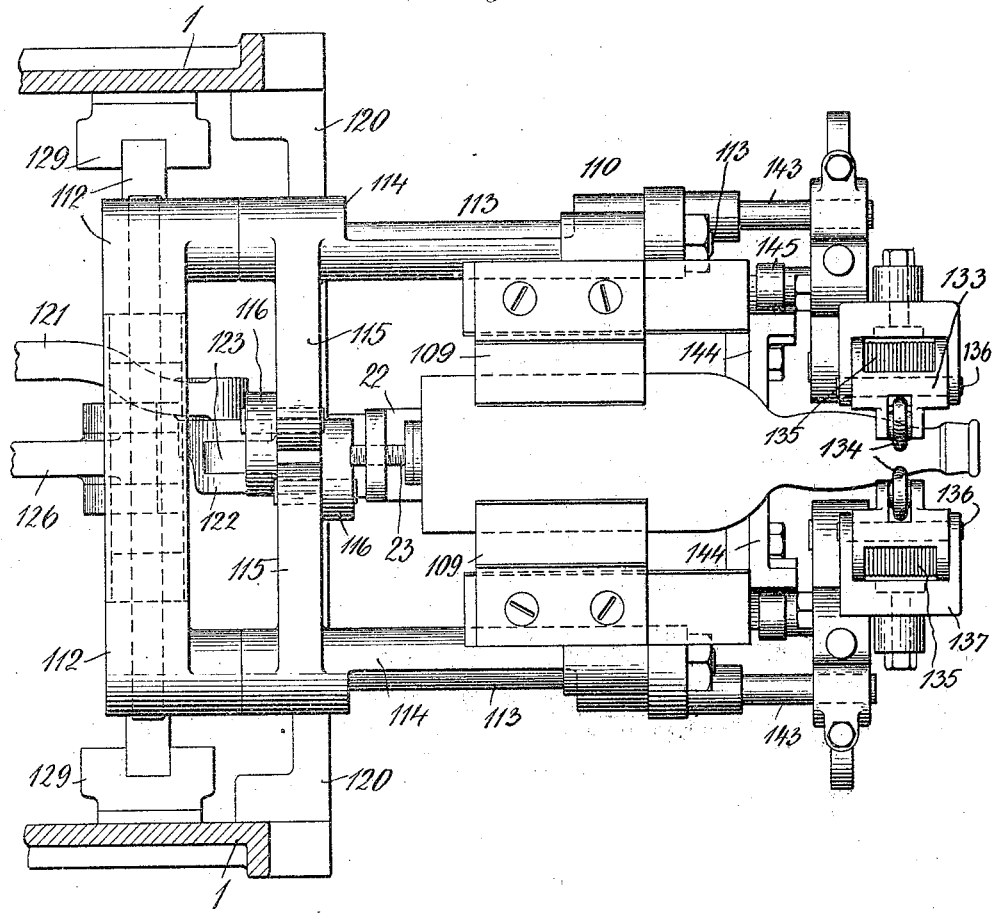

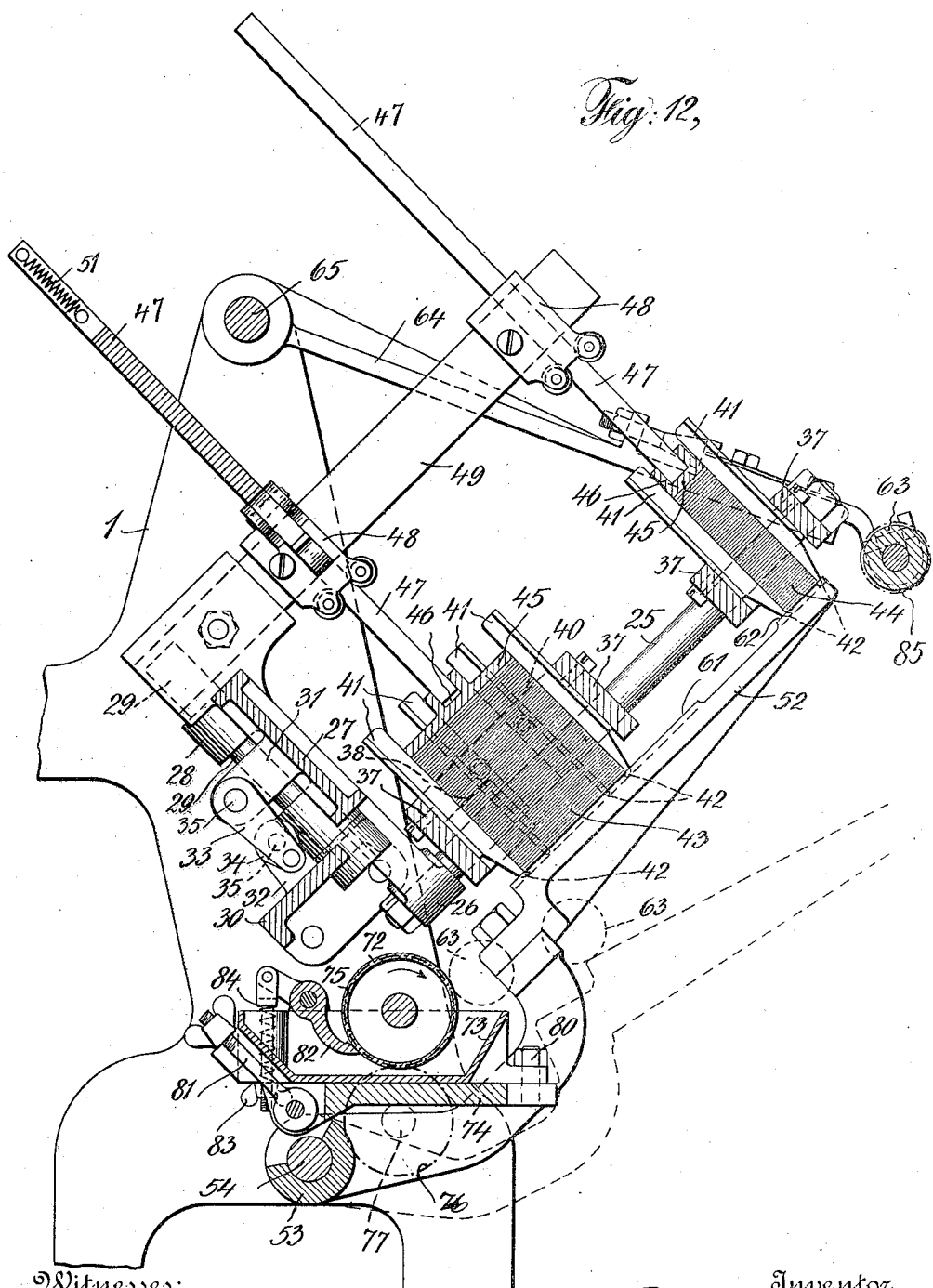

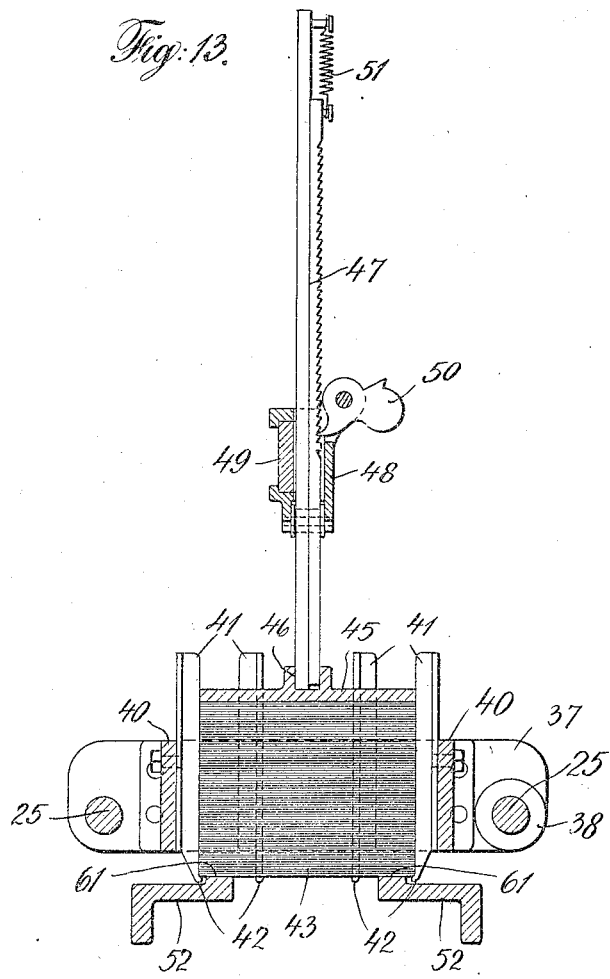

UNITED STATES PATENT OFFICE.

EDWARD ERMOLD, OF NEW YORK, N. Y.

BOTTLE-LABELING MACHINE.

1,023,143. Specification of Letters Patent. Patented Apr. 16, 1912.

Application filed September 21, 1910. Serial No. 583,030.

*To all whom it may concern:*

Be it known that I, EDWARD ERMOLD, a citizen of the United States, and a resident of New York, in the county of New York and State of New York, have invented certain new and useful Improvements in Bottle-Labeling Machines, of which the following is a specification.

This invention relates to improvements in machines for applying labels to bottles, and comprises improvements upon the machine for the same purpose set forth in my Patent No. 923,501, dated June 1, 1909.

My present invention embodies an improved picker mechanism for transferring labels from label receptacles to the bottles, improved means for applying paste to the pickers and thence to the labels, an improved arrangement and location of the label receptacles, whereby an improved and simpler picker mechanism becomes practicable, improved means for holding the labels on the bottle after the pickers have deposited the labels thereon, and various other features hereinafter described and particularly pointed out in the appended claims.

In my Patent No. 923,501, above mentioned, I have illustrated and described a machine adapted for the same purpose as the present machine, but in which the label receptacles are located vertically, the pickers which transfer the labels from these receptacles to the bottles being arranged to reciprocate up and down. To apply paste to such reciprocating pickers said pickers, according to said patent, are given a turning movement, in addition to their upward movement, and paste rollers contact with the surfaces of said pickers and apply paste thereto while the pickers are in their turned position. In my present machine I place the label receptacles in an inclined position instead of a vertical position, and employ pivoted pickers which oscillate between the position for the bottle and the position for the label receptacles, and cause a paste roller to travel over the surfaces of said pickers, instead of, as in my former patent, turning the pickers themselves so that they may travel over the surfaces of the paste rollers. The angular position of label receptacles is determined, partly, by a desire to provide gravity feed of the labels, in said receptacles, and partly by a desire to reduce to a minimum the travel of the picker arms. Of course, the picker arms being oscillatory, the label receptacles may be any where in the path of oscillation of said pickers, sufficient room between said label receptacles and the position for the bottle being left; but the angle of oscillation of the pickers is naturally less when the label receptacles are in an inclined position, less than ninety degrees from the position for the bottle, (the bottle being held in a horizontal or nearly horizontal position), than when they are in some other position, more distant angularly from the bottle.

The objects of my invention are to improve the construction of bottle labeling machines such as referred to, to simplify the same, to make the same more rapid in action, more durable, and less expensive to manufacture, to avoid the bodily reciprocation of more or less complex mechanisms, to improve and simplify the pasting mechanism, and to reduce to a minimum the number of cams and the like employed for operating the various mechanisms, and to concentrate all the movable cams upon a stationary shaft.

I will now proceed to describe my invention with reference to the accompanying drawings and will then point out the novel features in claims.

Figure 2:
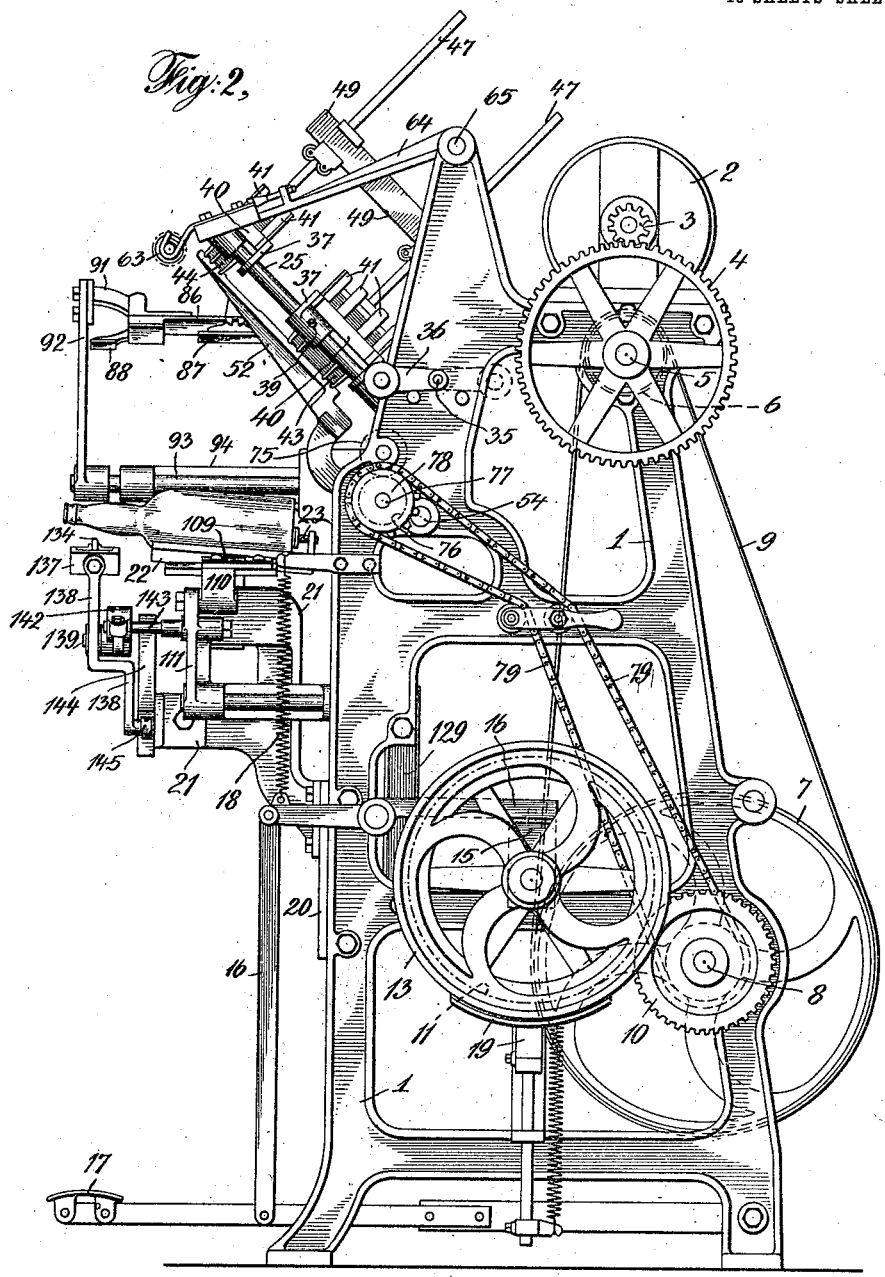
Figure 3:
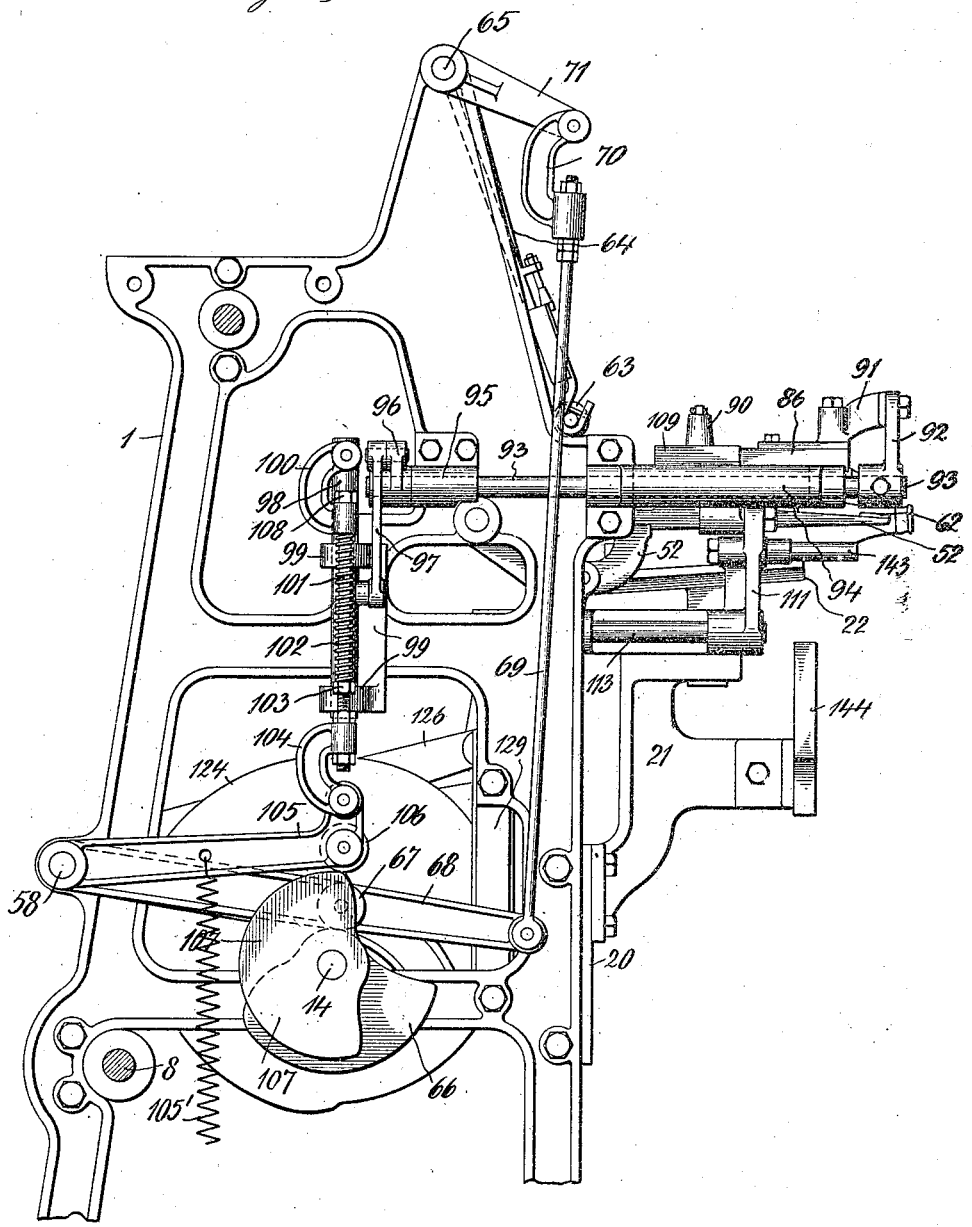
Figure 4:
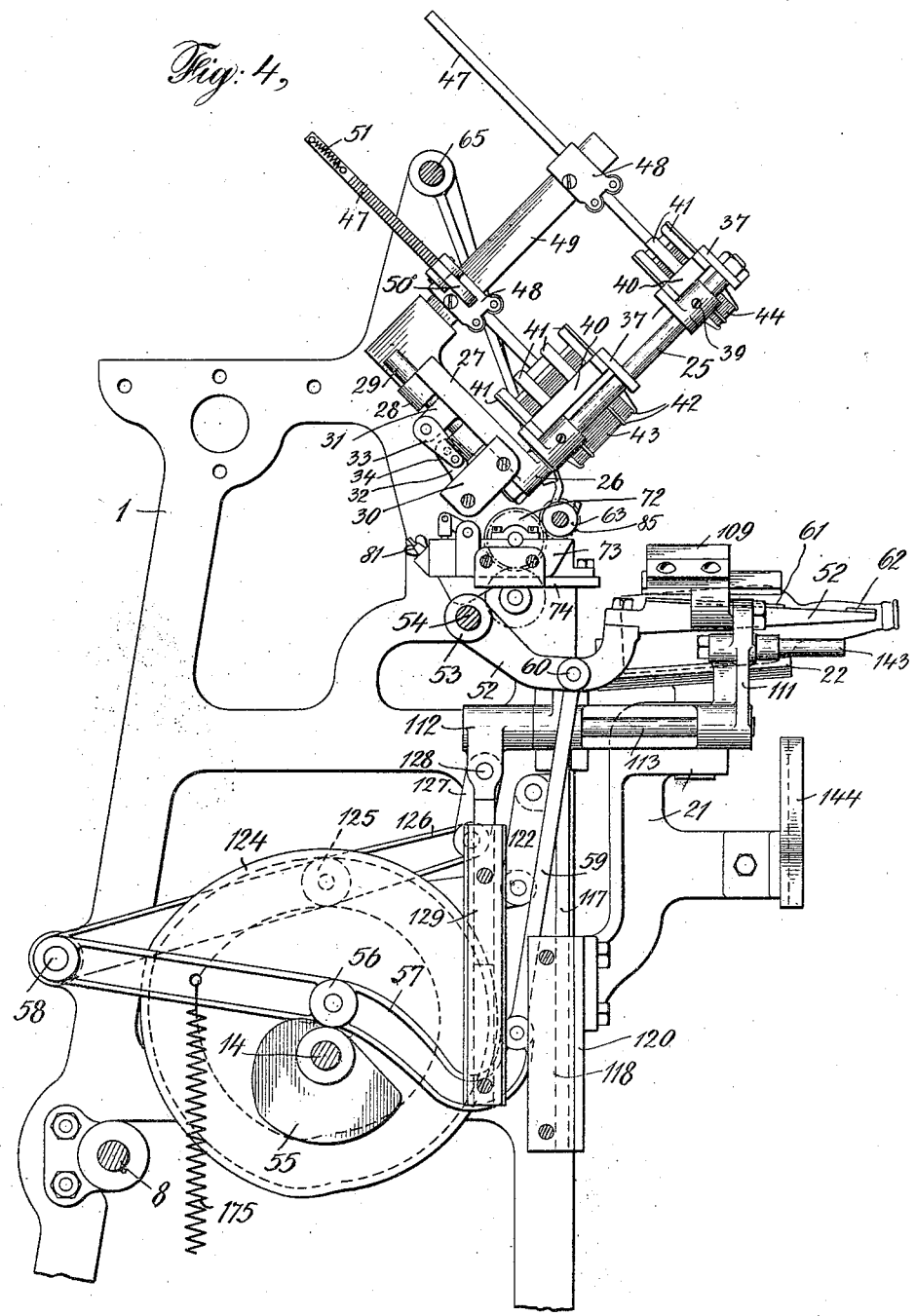
Figure 5:
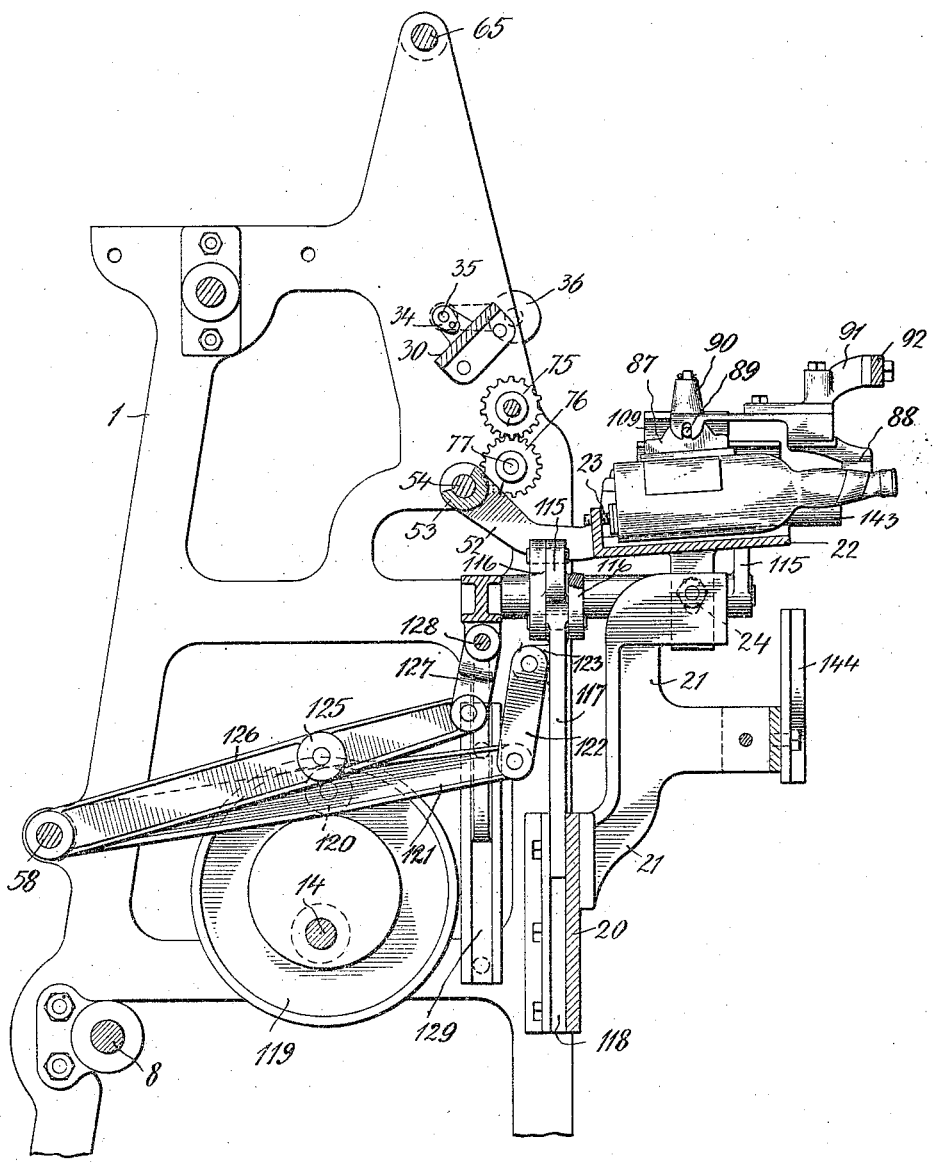
Figure 6:
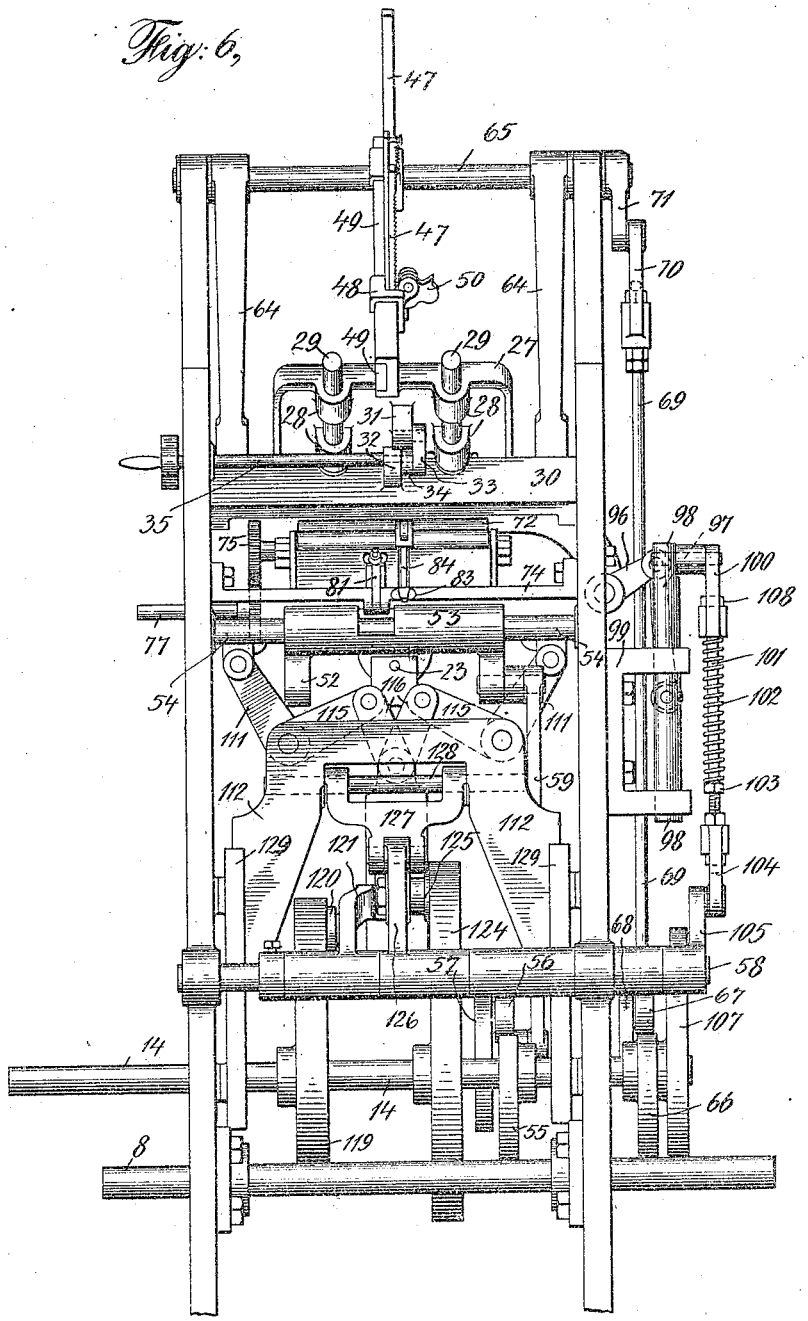
Figure 7:
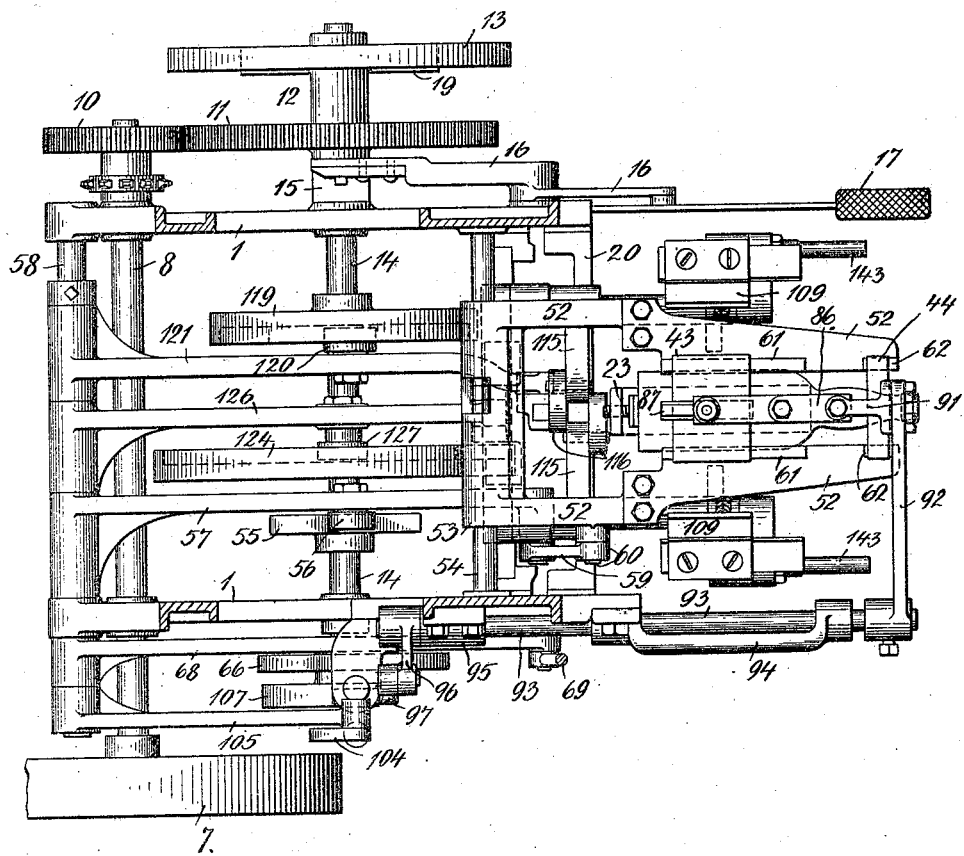

In the drawings: Figure 1 shows a front elevation of a bottle labeling machine embodying my invention; Fig. 2 shows an elevation of the right hand side of this machine; Fig. 3 shows an elevation, on a somewhat larger scale, of the central and upper portion of the left hand side of the machine, the neck label wipers, the label receptacles and certain other minor parts, being omitted; Fig. 4 is a side elevation of the mechanism of the machine looking from the left of Fig. 1, the left hand side frame of the machine, and various associated parts, having been omitted, the view therefore showing the mechanism between the side frames, looking from the left; Fig. 5 is another side view of the inner mechanism of the machine, looking from the left, certain of the parts shown in Fig. 4 being omitted and other parts, in rear of the parts shown in Fig. 4, being shown; portions of the machine being sectioned; Fig. 6 shows a rear elevation of the machine, portions of the mechanism being omitted; Fig. 7 shows a top view of the machine, the label receptacles having been omitted; Fig. 8 is a detail front elevation on a scale larger than the preceding figures, of the mechanism for applying the body labels to a bottle, the pickers being shown in the position occupied when placing a label on a bottle; Fig. 9 is a similar elevation showing the pickers moved upward, a front plate of the machine having been removed to show the cams for operating the wiping mechanism; Fig. 10 is another elevation of the label applying mechanism, showing the pickers in position to take fresh labels from the label receptacles, and also showing the neck label wipers and their operating mechanism; Fig. 11 shows a detail top view of the body label wiper mechanism and the neck label wiper mechanism; Fig. 12 shows a detail elevation and partial section of the label receptacles, the pasting mechanism and the pickers; Fig. 13 shows a detail view of one of the label receptacles and its follower mechanism.

The different operative parts of the improved bottle labeling machine are all supported upon a suitable frame 1, the operative parts being in the present instance driven by means of a motor 2 situated in the upper part of the frame. The shaft of the motor is provided with a pinion 3, which meshes with a gear 4 secured to one end of a shaft 5 passing through the frame of the machine and provided at its other end with a small pulley 6, which drives a larger pulley 7, mounted on one end of a shaft 8 situated in the lower part of the frame of the machine, by means of the belt 9. To the other end of the shaft 8 is secured a gear 10 which meshes with a gear 11 mounted upon a sleeve 12, provided with a fly-wheel 13, the same being operatively connected to a shaft 14 by means of a clutch 15 which is operated through the medium of levers 16 by a foot treadle 17, normally held in a neutral position by means of the spring 18. A spring actuated brake-shoe 19 which bears against the periphery of the fly-wheel 13 is provided for regulating the motion of the shaft 14.

Suitably secured to the front of the frame of the machine by means of a plate 20, is a bracket 21 which supports a bottle-rest 22 which is made of suitable shape to hold a bottle to be labeled. The bottle rest, in the present instance, is concave, and is provided at one end with means 23 for adjusting the rest to different lengths of bottles. The rest 22 is also made adjustable in a vertical direction and can be secured in any position in which it may be set, by means of a set screw 24. It is also to be noted that the bottle rest 22 is tilted slightly from the horizontal, to more readily hold the bottle to be labeled.

The label receptacles are supported in the upper part of the frame of the machine upon the inclined rods 25, the lower ends of which are mounted in suitable bosses 26 provided in a plate 27 at opposite sides thereof. The plate 27, which supports the rods 25, is provided on its rear side with lugs 28 (see Figs. 6 and 12), by which said plate is movably mounted upon guide rods 29 secured at their lower ends to a cross bar 30 mounted upon the frame of the machine. By moving the plate 27 up on the rods 29, the label receptacles are moved up out of reach of the picker-mechanism hereinafter described; it being desirable, at times, to do this. For so moving the plate 27, said plate is provided with a lug 31, on its rear side, to which is pivoted a link 33, also pivoted to a crank 34 (Figs. 4 and 12) on a rock shaft 35, which shaft is mounted in bearings in lug 32 of cross-bar 30 and in one side-frame of the machine. Upon the end of this rock shaft is a weighted hand-lever 36 by means of which said shaft may be rocked to raise or lower the plate 27 carrying the label receptacles. The leverage, between shaft 35 and plate 27, is such that said plate is moved very readily by means of lever 36, and the angular position of the weighted lever 36 on shaft 35 is such that when moved to shift the plate 27, it falls to one side or the other of the vertical, so holding plate 27 in one position or the other.

The label-receptacles in the present instance are two in number, one being provided for holding body labels which are to be pasted on the body of the bottle, while the other receptacle is provided for holding neck labels, which are to be pasted on the neck of the bottle. Both label receptacles are alike except that one is in the present instance arranged for larger labels than the other. The label receptacles each comprise transverse end members 37, movably mounted upon the rods 25, for the purpose of adjustment, one end of each of the members 37 being provided with a suitable boss 38 in which is a set screw 39 for holding such member 37 in position on the rods 25. Suitable side members 40 are secured to the end members 37 and to them are secured label fingers 4, the lower ends of which are provided with lips 42 (Fig. 12) for holding a pile of labels, 43 or 44, it being noted that the end members 37 are also provided with label fingers 41 having lips 42 similar to the label fingers secured to the side members 40. On top of each set of labels is arranged a weight 45 for pressing the labels downward so that they will feed readily out of the bottom of the receptacles. Each of the weights is provided with a recess 46 into which rests the end of a rod 47 which passes through a guide 48 supported upon an arm 49 one end of which is secured to the plate 27. In the present instance the rod 47 which rests upon the weight 45 of the labels 43 is made in two pieces, as shown more clearly in Fig. 13, one of said pieces being provided with a rack which engages a pawl 50 secured to the guide 48 so as to limit the upward movement of the weight 45, the two pieces of the rod 47 being operatively connected together by means of the tension spring 51. It is to be noted that the double rod 47 just described is not used on top of the labels 44, a single rod being used, although it is to be understood that a double rod may be used if so desired. The label receptacles as above described are clearly shown in Figs. 1, 2, 4, 6, 10, 12 and 13, it being noted that the label receptacles instead of being placed in a vertical position are set at an angle of about forty-five degrees; the reason for which will be explained hereafter.

Pickers 52, the lower ends of which are secured to a sleeve 53, loosely mounted upon a shaft 54 secured to the frame of the machine, are provided for removing the labels one by one from the bottom of the label receptacles. The pickers are operated through the medium of a suitable cam 55 (Fig. 4), secured to the cam shaft 14, which cam engages a roller 56 secured to a lever 57 pivoted at its rear end to a shaft 58 mounted in the frame of the machine, while to the other end of the lever 57 is connected one end of a rod 59, the other end of which is pivoted to one of the pickers intermediate of its length, at 60, so that when the lever 57 and rod 59 are operated, the pickers will be moved from the position shown in Fig. 4 to the position in Figs. 2 and 12. The top surfaces of the pickers are each provided with raised portions 61 and 62 to which paste is applied for engaging the edges of the bottom labels in the label receptacles when the pickers are in the position shown in Figs. 2 and 12 and to remove the bottom labels from the label receptacles when the pickers are lowered to the position shown in Figs. 4 and 7.

A paste roller 63, pivoted to arms 64 mounted upon a shaft 65 secured to the top of the frame of the machine, is provided for applying paste to the portions 61 and 62 of the pickers, and is arranged to move along the pickers 52, lengthwise thereof, during the upward movement of said pickers. The paste roller is operated through the medium of a cam 66, secured to the cam shaft 14, and engaging a roller 67 secured to a lever 68 pivoted at its rear end to the shaft 58, while to the front end of the lever 68 is connected one end of a rod 69, the other end of which is adjustably connected by a link 70 to one end of an arm 71 which is keyed to shaft 65. The cam 66 is so set and shaped in relation to the cam 55 which operates the pickers, that the paste roller 63, on the upward movement of the pickers, passes lengthwise over the portions 61 and 62 of the pickers so as to coat the same with paste, so that the bottom labels from the label receptacles will adhere to said pickers, upon contact therewith, and so that the ends of these labels will receive paste from the pickers. In Fig. 12 the paste roller is shown, in dotted lines, in the position occupied when, during the upward movement of the pickers, the paste roller is just beginning to travel over the pickers, while in full lines the parts are shown in the positions occupied just after the paste roller has swept over the pickers and has cleared the same to permit contact of the pickers with the bottom labels in the two label receptacles. When the pickers next move down, due to the action of their cam 55, cam 66 moves the paste roller 63 back to its first, or rear position, the paste roller passing over, but clear of, the labels then being carried down by the pickers. When the paste roller has moved back again to its lowermost position it is forced by reason of its own weight, and that of the arms 64 against a roller 72 rotating in a paste box 73 suitably secured to the frame of the machine by means of the support 74. For rotating the supply roller 72 the same is provided with a gear 75 which meshes with a gear 76 secured to one end of a short shaft 77, mounted in the frame of the machine, to the other end of which is secured a sprocket wheel 78 connected to the driving shaft 8 through the medium of a chain 79. The paste box 73 is mounted upon the support 74, as shown in Fig. 12, by means of bolts 80 at one side and a swinging bolt 81 at the other, which permits of the same being readily removed and adjusted. The amount of paste taken up by the supply roller 72 is regulated by means of a scraper 82 which is regulated by means of a winged nut 83 secured to one end of stud 84 the other end of which is pivoted to the scraper 82. To insure the paste roller 63 being coated with an even layer of paste the shaft of the paste roller is provided with a small gear 85, (see Figs. 1 and 10) which meshes with the gear 75 of the supply roller 72, when the paste roller is in the position shown in Figs. 3 and 4. The pickers 52 carry the labels downward until said labels rest, in predetermined portions, on the body and neck of a bottle in place on bottle rest 22.

A presser-arm 86 (Figs. 3, 5 and 7) is provided for holding the labels in position on the bottle after the pickers have moved to their lowermost position with the labels, as shown in Figs. 3 and 7. In the present instance the presser-arm 86 is provided with presser-fingers 87 and 88 (Fig. 5) for holding the body label and neck label in position on the bottle, once the same have been applied by the pickers, as previously described. The presser-finger 87 in the present instance, is pivoted to the presser arm at 89, as shown in Fig. 5, suitable spring acting means situated in the cap 90 being provided for relieving the pressure of the finger 87 on the bottle. The presser-arm 86 is connected by bracket 91 to an arm 92 (Figs. 1, 3, 5, 7 and 9) at right angles to the presser-arm, the other end of said arm being secured to one end of a shaft 93 having bearings in brackets 94 and 95 fastened to the frame of the machine. To the other end of the shaft 93 is secured a rocker-arm 96 connected by a link 97 to a vertically reciprocating rod 98 (Figs. 1 and 3) supported on the frame of the machine by a bracket 99. Pivoted to the upper end of the rod 98 is a hook-shaped bracket 100 (Fig. 3) in which is slidably mounted one end of a rod 101 which is provided with a coiled spring 102 held in position at the lower end by means of a nut 103, the other end of the spring bearing against the end of the bracket 100. The lower end of the rod 101 is secured to a similar hook shaped bracket 104 (Fig. 3) to which is pivoted one end of a lever 105, the other end of which is pivoted to the shaft 58. The lever 105 is provided with a roller 106 which engages a cam 107 secured to the cam shaft 14.

From the above description it will be seen, by referring to Figs. 1, 3, 6 and 7, that when the cam 107 rotates the shaft 93 is oscillated back and forth so as to raise and lower the presser-arm 86, the cam 107 being so designed and arranged that the presser-arm is made to engage the bottle only after the pickers have placed the labels over the bottle as shown in Fig. 7. After the presser-arm has engaged the label on the bottle the presser-arm remains in that position, the pickers by reason of the action of the cam 55 moving upward as shown in Figs. 2 and 10, and the wipers (hereinafter mentioned) then engaging the labels on the bottle. In order to obtain a uniform pressure on the presser-arm to retain the labels on the bottle, and at the same time not to break the bottle, the movement of rod 98 which oscillates the shaft 93 upward by the action of the cam 107, is controlled by the action of the spring 102 the tension of which is regulated by the nut 103. When the movement of the cam 107 allows the lever 105 to drop downward, thereby raising the presser-arm 86, the coil spring 105' pulls the lever 105 down and holds the presser arms off the bottle until the cam 107 again raises the lever. The spring 102 acting against the link 100 when the lever 105 is raised by cam 107, eases the downward movement of the presser arm against the bottle thereby avoiding a sudden and hard blow upon the bottle, while on the return movement the nut 108 acts directly upon the link 100 so that this movement is a quick and positive one.

Two pairs of wipers are employed, one pair for applying the body-label to the body of the bottle, and a second pair of wipers for applying the neck label to the neck of the bottle. The wipers for the body-labels comprise, in the present instance, yielding rubber plates 109 (Figs. 8, 9 and 11) suitably secured in holders 110, pivoted to the ends of the crank arms 111, (Figs. 8 and 9), which are pivoted to a yoke plate 112 by means of studs 113. The other ends 115 of the crank arms are connected pivotally by links 116 to a vertical slide 117 which runs in guides 118 (Fig. 5) secured to the back of the plate 20. The slide plate 117 is moved up and down so as to oscillate the body-label wipers by means of a cam 119 (Fig. 5), keyed to the cam shaft 14, through the medium of an anti-friction wheel 120 mounted upon a lever 121 which is pivoted at one end to the shaft 58 and at the other end is connected by a link 122 to a lug 123 of the slide plate 117. In order to move the body label wipers up and down, the yoke plate 112, to which the body label wipers are pivoted through the medium of shafts 113, is moved up and down in guideways (Figs. 5, 8 and 9) 129, on the frame of the machine, by means of a cam 124, (Fig. 4) secured to the cam shaft 14, which operates an anti-friction roller 125 secured to a lever 126 one end of which is pivoted to the shaft 58 while the other end is connected to a Y-shaped link 127 (Figs. 4, 8 and 9) itself connected to the yoke plate 112 by means of a shaft 128. The cam 119 which oscillates the body label wipers in and out and the cam 124 which moves the body label wipers up and down are so designed and set, in relation to the cams which operate the pickers 52 and the presser-arm 86, that the body label wipers are in the position shown in Fig. 8 when the pickers place the labels on top of the bottle, and when the presser-arm 86 moves to hold the labels in this position; after which the cam which operates the pickers moves the same upward as shown in Fig. 9 so that the body label wipers can be moved inward by the action of the cam 119, as shown in this figure, after which the yoke plate is moved downward by the action of the cam 124 so as to draw the rubber plates 109 over the body label, the action of the cam 119 keeping the body label wipers during their downward movement in the same relative vertical position in relation to the yoke plate 112 as that shown in Fig. 9. In order to provide a certain amount of flexibility to the body label wipers in addition to the resiliency of the rubber plates 109, the holders 110 are provided with suitable lugs 130 which are flexibly connected to the end of lugs 131 by means of the springs 132, the lugs 131 being secured to the lower ends 115 of the crank arms.

The wipers for the neck-labels comprise in the present instance elbow-shaped knuckles 133 (Figs. 10 and 12) each of which is provided at one end with a guide roller 134 and at the other end with wiper strips 135, a more detailed description of the neck-wiper being given in my Patent No. 966,536, dated August 9, 1910. The wipers for the neck labels as above referred to are pivoted by means of a pin 136 to a forked member 137, in the usual manner, so as to permit of freedom of movement of the knuckles to adjust themselves to the surface of the bottle. The forked members 137 are secured to one end of cam levers 138 (Figs. 1 and 10) each of which is pivoted near its center by a pin 139 to one end of a short arm 140, the other ends of arms 140 being secured to studs 141 which are adjustably clamped to clamps 142 mounted upon rods 143 which are secured to the crank levers 111, 115, which support the body-wipers, so that the neck wipers make the same combined motion as the body-wipers. To this motion is added a third one by means of stationary cam-plates 144 (Fig. 10) secured to the bracket 21, which act upon the rollers 145 pivoted to the lower ends of the cam levers 138, and held in position against the cam plates 144 by the action of the springs 146. It will be seen that the cam-plates 144 are so shaped as to force the neck-wipers inward during their descending motion to produce the wiping action on the neck label by guiding the neck wipers by their rollers around the bottle neck. This third motion is added to the neck wipers so as to successfully apply neck labels that entirely encircle the bottle neck. In order to prevent the neck-wipers interfering with each other, one of them is set a little above the other, which is accomplished by making the rod 141 on the left hand side of Fig. 10 longer than the corresponding rod 141 on the right hand side. In case it is desired to use neck labels that are only long enough to go half way around the neck of the bottle, wipers similar to the body-wipers may be used, instead of the more highly organized wipers shown.

The operation of the machine is as follows: The operator first starts the machine in operation by pressing his foot upon the foot treadle 17 after having placed a bottle upon the bottle rest 22. The machine in its operation moves the pickers 52, from their position under the label receptacles, with a body-label and a neck-label, to a position slightly below the top surface of the bottle, when during the further operation of the machine the presser-arm is moved into position to engage the labels and hold them in position on the bottle, so that the pickers can be moved upward out of the way of the wipers which thereafter engage the ends of the labels and press them against the surface of the bottle, after which the bottle is removed and another one put in its place. The pickers in the meantime after releasing the labels, held in position on the bottle by the presser-arm, move upward and in so doing are met by the paste-roller which coats the raised portions of the pickers with paste, so that when the raised portions of the pickers come in contact with the bottom labels in the label receptacles, the same will stick so that they can be removed as before described. After the wipers have engaged the labels on the bottle as before referred to, the presser-arm is moved upward so as to permit of the pickers carrying labels for another bottle to pass.

It will be obvious that this machine is adapted for labeling other articles than bottles—such for example as cans. In this specification the operation of the machine has been illustrated and described with reference to the labeling of bottles simply as an illustration of its action on one of the many classes of articles on which it is adapted to act. The machine is not, of course, limited to the application of two labels, but may comprise such number of label holders and wiper mechanism therefor, as desired, and according to the number of labels desired to be placed upon the articles to be labeled.

It will be obvious that by employing oscillating pickers instead of sliding pickers, and by avoiding any other motion for the pickers than the regular oscillation thereof between the label holder and bottle rest, and by providing a paste roller to travel over the surface of the pickers, I have very greatly simplified the picker mechanism and pasting mechanism of the machine, as compared with the machine of my former Patent No. 923,501; and it will be apparent that the new machine is capable of operating at higher speed and with greater durability. Furthermore, by inclining the label receptacles, as shown, said label receptacles being within ninety degrees of the position of the bottle or other article to be labeled, and preferably being not more than forty-five degrees, from the position of the bottle, as shown, the amplitude of necessary movement of the pickers is made very small, thereby permitting relatively rapid operation.

In the present instance the presser-arm is operated from the side of the machine, which makes possible the simplification of the picker means over that of my former patent where the presser arm was operated from between the pickers.

What I claim is:—

1. A bottle labeling machine comprising in combination a rest adapted to support a bottle or the like to be labeled, a plurality of gravity feeding label receptacles arranged above said rest, oscillatory picker means for transferring labels from said receptacles to articles on said rest, an oscillatory adhesive applying roll arranged to travel over the surfaces of said picker means, a presser adapted to hold a plurality of labels on articles on said rest, wiper mechanism for securing a plurality of labels to the article to be labeled, and operating means for said pickers arranged to return said pickers for new labels while the wiper mechanism is operating to secure the labels previously obtained to the article to be labeled.

2. A labeling machine comprising in combination a rest adapted to support a bottle or the like to be labeled, a plurality of gravity feeding label receptacles arranged above said rest, oscillatory picker means having raised portions thereon for transferring labels from said receptacles to articles on said rest, an oscillatory adhesive applying roll arranged to travel over the raised portions of said picker means, a presser adapted to hold a plurality of labels on articles on said rest, and wiper mechanism for securing a plurality of labels to said articles to be labeled.

3. A labeling machine comprising in combination a rest adapted to support a bottle or the like to be labeled, a plurality of gravity feeding label receptacles arranged above said rest, oscillatory picker means for transferring labels from said label receptacles to articles on said rest, the angle of oscillation of said picker means between said support and said label receptacles being less than ninety degrees, an oscillatory adhesive applying roll arranged to travel over the surface of said picker means and to apply adhesive thereto during the travel thereof toward the label receptacles, a presser adapted to hold a plurality of labels on articles to be labeled, and wiper mechanism for securing a plurality of labels to said articles.

In testimony whereof I have signed this specification in the presence of two subscribing witnesses.

EDWARD ERMOLD.

Witnesses:
HANS KALTENHAUSER,
D. A. DAVIES.